No. 754,566. PATENTED MAR. 15, 1904.
P. L. HULIN.
PROCESS OF TREATING MATTERS IN FUSION.
APPLICATION FILED DEC. 29, 1902.
NO MODEL. 3 SHEETS—SHEET 1.
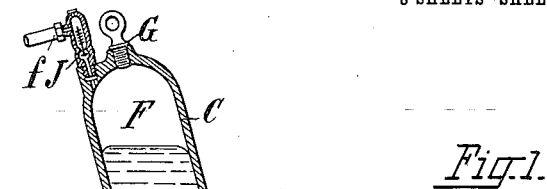
*Fig. 1.*
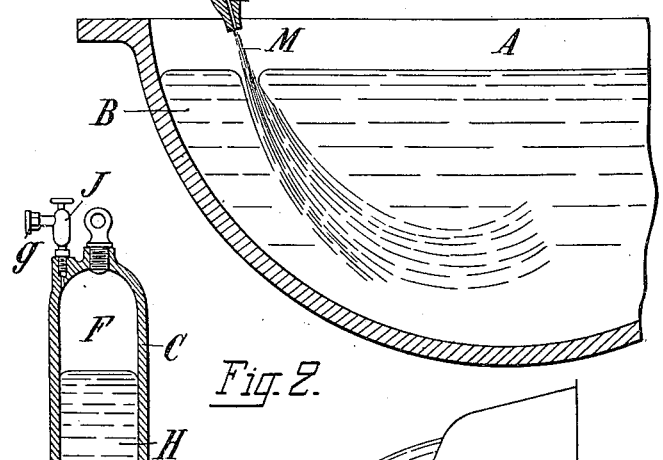
*Fig. 2.*
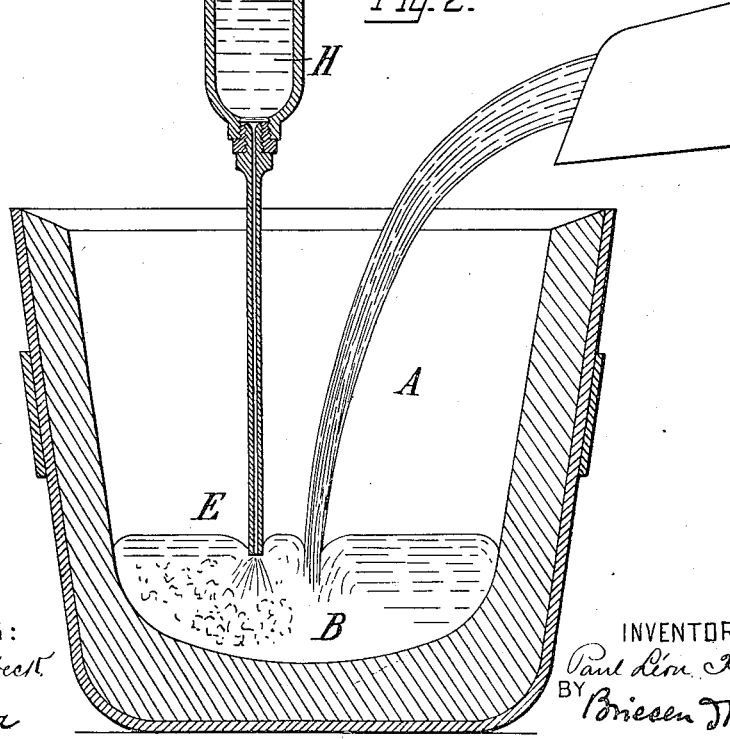
WITNESSES:
J. A. Stehlenbeck
John Lotka
INVENTOR
Paul Léon Hulin
BY Briesen & Knauth
ATTORNEYS

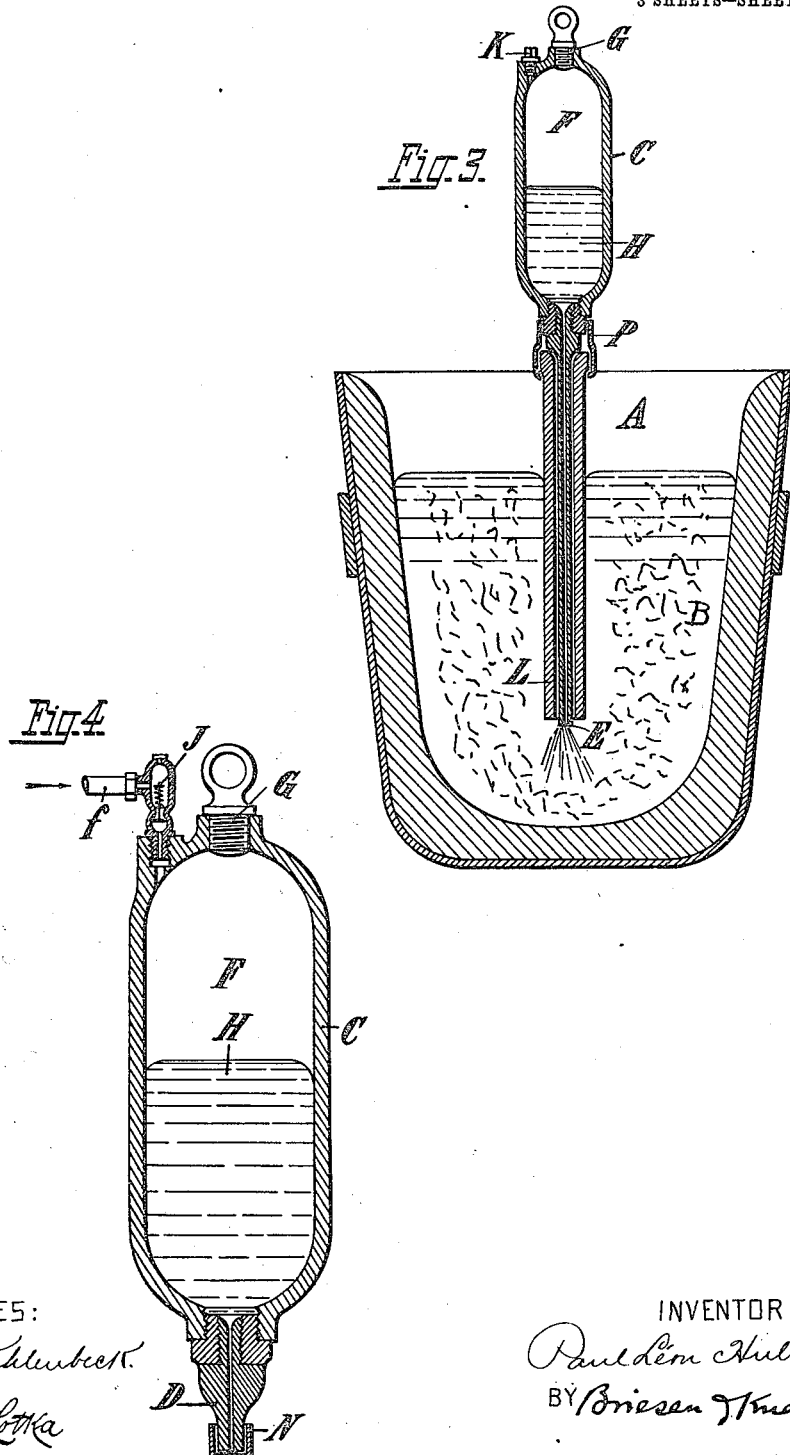

No. 754,566. PATENTED MAR. 15, 1904.
P. L. HULIN.
PROCESS OF TREATING MATTERS IN FUSION.
APPLICATION FILED DEC. 29, 1902.
NO MODEL. 3 SHEETS—SHEET 3.
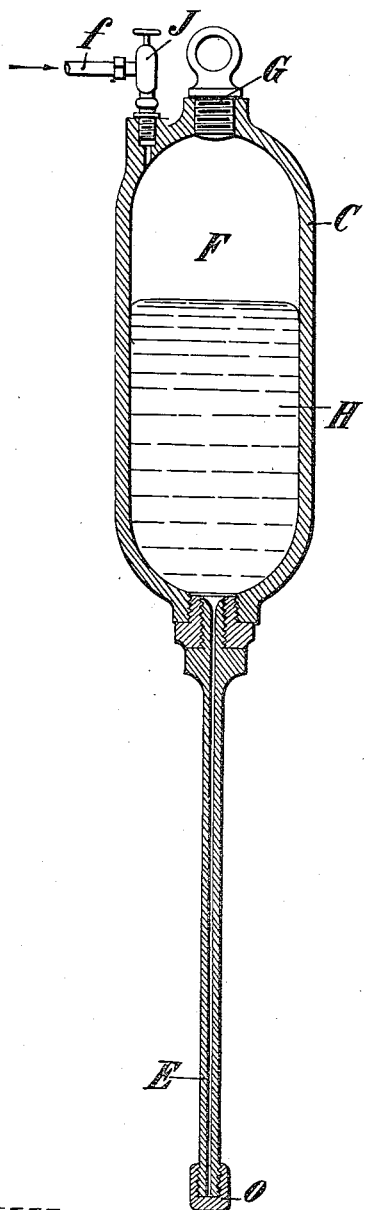
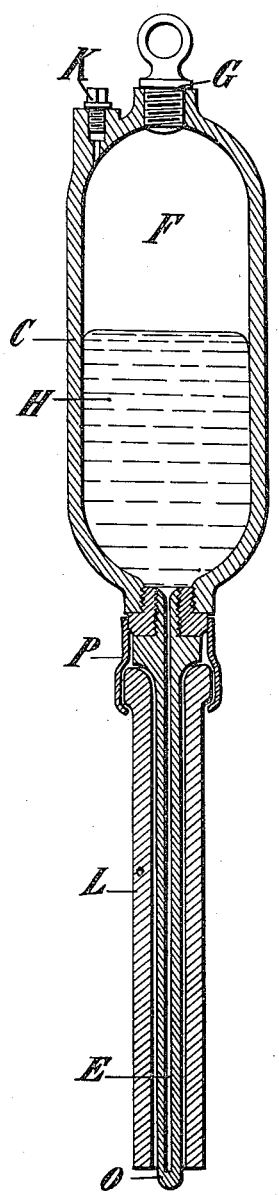
WITNESSES:
INVENTOR
Paul Léon Hulin
BY Briesen Knauth
ATTORNEYS No. 754,566.

Patented March 15, 1904.

UNITED STATES PATENT OFFICE.

PAUL LÉON HULIN, OF CLAVAUX, PAR RIOUPÉROUX, FRANCE.

PROCESS OF TREATING MATTERS IN FUSION.

SPECIFICATION forming part of Letters Patent No. 754,566, dated March 15, 1904.

Application filed December 29, 1902. Serial No. 136,926. (No specimens.)

*To all whom it may concern:*

Be it known that I, PAUL LÉON HULIN, engineer, of Clavaux, par Riouperoux, Isère, Republic of France, have invented a Process for Treating Matters in Fusion, of which the following is a full, clear, and exact description.

This invention relates to a process for effecting in a practical and advantageous manner the incorporation of sodium or alkaline compounds with metals or matters in fusion on which it is desired that the alkalies should react.

The commercial utility of a practical process of incorporating sodium with molten matters is especially evidenced by the following examples:

First. It would be of great advantage in metallurgy to be able to cause sodium or alkaline compounds to react readily and effectually within the mass of such metals as cast-iron, steel, nickel, copper, &c., in fusion, as especially sodium and also certain of its derivatives are the best purifying agents for such metals. The alkalies destroy or eliminate in a state of highly fluid slag the oxids, phosphids, arsenids, &c., contained in ordinary metals, which may thus be obtained in a very pure condition.

Second. It would even be advantageous to be able to conveniently alloy sodium with aluminium or with zinc or other metals in which it cannot be readily or uniformly dissolved. For instance, if zinc and sodium be heated together difficulties arise in obtaining a homogeneous alloy.

Third. It is also necessary to be able to effect on a large scale without danger and with good economical results the reduction of certain chlorids, fluorids, and other compounds in igneous fusion by means of sodium, which liberates the metal by combining with the chlorin or the fluorin, &c.—for example, chlorid of magnesium, fluorid of aluminium, and similar compounds of chromium, manganese, &c., and even chlorids of calcium and barium when operating in presence of a metal, such as zinc, capable of absorbing calcium or barium. It is known that by the reaction of sodium with these matters in fusion there is formed, on the one hand, chlorid or fluorid of sodium, and, on the other hand, metallic magnesium, aluminium, chromium, or manganese. With chlorids of calcium or barium in presence of zinc an alloy of zinc and calcium or of zinc and barium, &c., is obtained. These operations above referred to have not become commercially available on account of the difficulties attendant on the employment of sodium or alkaline compounds by known methods.

Fourth. There are many other chemical or metallurgical reactions requiring some practical method of employing sodium in order to render them available commercially. So far as I am aware it has been usual hitherto to employ sodium in lumps—that is to say, in compact masses—which were, moreover, mechanically inert at the moment of entering into reaction. Under these conditions the properties of sodium are incompatible with its use for the operations in question.

The lightness of sodium and of alkaline compounds prevents them from penetrating into or remaining in the midst of the molten mass, while their volatility at the temperatures of the operation causes occasional blowing up or overflowing of the molten matters. Moreover, the chemical activity of these alkaline compounds in a floating condition destroyed the apparatus and rendered the operations difficult and often impracticable.

The present invention has for its object to practically and economically effect the incorporation of sodium and alkaline compounds lighter than the bath of molten matter and which are at the same time either volatile or corrosive or difficult to use at the necessary temperatures with the necessary degree of safety. My invention therefore provides a practical method of effecting on a commercial scale the metallurgical or chemical operations hereinbefore referred to.

In order to simplify the description, the term "bath" will hereinafter be frequently applied to the metals and matters in fusion subjected to alkaline treatment, and I desire it to be understood that instead of sodium I may employ as equivalents thereof the readily-fusible alkaline compounds, such as caustic alkalies, alkaline nitrates, &c.

The process consists, essentially, in introducing the sodium into the bath in a liquid state and in the form of a fine jet, which is caused to penetrate the mass in a downward direction (perpendicularly or obliquely) under the action of high pressure. By these means the alkali metal acts upon the mass by mechanical action derived from the powerful downwardly-penetrative movement of the jet of liquid sodium. This mechanical penetrative action which is exerted in opposition to the buoyant or ascensional force tends to cause the sodium to escape, and thus a breaking up and an intimate incorporation of the molecules is effected. These mechanical effects thus coöperate with the chemical action and enable it to attain its maximum of efficiency. My process is thus characterized by the downwardly-directed penetrative movement of a stream of sodium as a means of causing it to exert chemical action upon dense matters in fusion.

Reference is to be had to the accompanying drawings, in which—

Figure 1 is a sectional elevation of an apparatus suitable for carrying out my invention. Figs. 2 and 3 are similar views of two other forms of apparatus. Figs. 4, 5, and 6 are sectional elevations of the sodium-containers used in conjunction with the apparatus shown in Figs. 1, 2, and 3, respectively.

A is any suitable container for the molten bath, and B is the bath in fusion (metal or compound) into which the sodium is to be injected for purposes of purification, alloying, or decomposition. C is a vessel containing liquid sodium under pressure.

D, Fig. 1, and E, Figs. 2 and 3, represent a twyer or small-bored nozzle giving passage to a fine jet of sodium which under the high pressure applied at F in the vessel C is projected downward into the bath at a sufficiently-high initial velocity to insure its penetration. The jet on striking the molten material becomes divided into very minute globules, which owing to the force of the jet are stirred into and become dispersed through the mass of the bath, whereby the sodium becomes absorbed and utilized in an efficient manner. As the sodium is not in the form of lumps nor locally massed in the bath, but is, on the contrary, in a high state of dispersion and tenuity, the reaction is performed without danger, and the destructive effect on the apparatus is reduced to a minimum. Should the temperature cause volatilization of the sodium, (as in purifying molten steel,) this distillation being distributed uniformly it will be easy to confine the mass in ebullition.

I designate as "scouring" the operation hereinbefore described, which consists in introducing sodium into baths in fusion in the form of a liquid jet having the velocity necessary for its downward penetration and rapid dispersion. This appellation has reference to the most important application of the process at present foreseen—viz., the purification of metals on leaving the melting-furnaces.

The apparatus devised for practically effecting the incorporation of sodium in baths in fusion present some new and characteristic features in view of the process for which they are designed. These apparatus (separately represented in Figs. 4, 5, and 6) I denominate "scourers." They are by their nature independent of any vessel, ladle, melting-pot, crucible, or furnace, &c., in which the baths to be treated are contained, as likewise the nature of the molten matters to be subjected to the action of the sodium jet, the twyers being of course adapted to the kind of work to be performed. In practice this independence is relative, as the scourers may be more or less adapted or fixed to the vessels containing the baths at the time of performing the operation; but they would always be made removable, an especial feature being the fact that they may be removed and be charged and prepared at a distance from the baths of molten material to be operated on.

Figs. 4, 5, and 6 represent the principal varieties of the apparatus. C, Figs. 1 to 6, is a metallic container hermetically closed and capable of withstanding high pressures, into which the melted sodium H is introduced through the orifice closed by a screw-plug G, a sufficient space F above the sodium being left for fluid under pressure, such as a suitable gas, vapor, or liquid. This compressed fluid which supplies the motive force may be supplied to F through a pipe $f$ from an outside reservoir or compressor, with which it may remain in communication during the discharge of the sodium. This external source of supply is not, however, necessary, and as it is inconvenient when performing the operation it may be dispensed with by adopting what I term a "charged" scourer, which fulfils all requirements and is easily manipulated. For this purpose the chamber F is made of such capacity that the supply of compressed gas or vapor contained is sufficient to insure the discharge of the sodium under proper conditions. The compressed gas is obtained from any suitable source and is introduced through the valve J by means of a connecting-pipe $f$, which when the pressure is established is disconnected after shutting a screw-valve $g$, as shown in Fig. 2. The gas employed may be of various kinds—viz., nitrogen, carbonic oxid, carbonic acid, poor gas, or even ordinary air—to the exclusion of ammoniacal gas, steam, alcohol, and others capable of readily combining with sodium.

To avoid the employment of a special supply of compressed gas, and thus still further simplify the apparatus, I may substitute for the gas a suitable volatile liquid, by which pressure would be generated at the moment of use when the vessel is heated for the purpose of melting the sodium. For this purpose when the sodium-container is cooled a supply of benzene or spirit or other suitable volatile liquid capable of producing a high pressure is introduced at G or K, and the plug is then hermetically closed. The vessel thus charged is prepared for use by heating the container C in order to melt the sodium and volatilize the benzene, thereby generating high pressure, which, acting upon the sodium, insures its discharge at a high initial velocity.

The apparatus also comprises as a distinctive feature a discharge nozzle or tube for delivering the sodium in the form of a fine jet of liquid, consisting of and herein referred to as the "twyer" D, Fig. 1, or E in Figs. 2 and 3. It may be of three different forms (shown in these three figures) and is made of iron or steel, copper, bronze, or nickel, or of other sufficiently strong material, either bare or cased, either wholly or partly in a sheath of refractory material, such as that shown at L. It consists, essentially, of a strong tube D or E, firmly connected to the lower end of the container C. Its bore is very small—that is to say, from one to five millimeters only, for instance; but this dimension may, however, vary according to circumstances and is in no way limited. The walls of the twyer-tube should be made comparatively thick. The arrangement shown in Fig. 1 is characterized by the disposition of the twyer D at a distance above the bath B, so that the jet of sodium M is caused to traverse the intervening space by its momentum and penetrate the bath by the effect of a ballistic action. This form of apparatus is more particularly employed for treating metals or matters in fusion, which could not conveniently be brought into contact with the twyer, or when it is desired to avoid changing it, or where the products of the operation are liable to be soiled. This arrangement is suited for the treatment of baths of which the level does not vary much during the operation, and it is particularly employed in the preparation of alloys.

As an example of working I will describe the preparation of an alloy of sodium and aluminium. I take a scourer with a short twyer, such as C D, Figs. 1 and 4, close the twyer by means of an aluminium cap N, introduce melted sodium at the orifice G, leaving the necessary space above the liquid to contain the motive fluid F. The orifice is then closed by the stopper, and the elastic pressure in the container is then generated by one of the methods hereinbefore specified. The vessel C D is then uniformly heated throughout to a temperature higher than the fusing-point of sodium—viz., to about 150° centigrade—and it is then brought over the bath B with the twyer slightly raised above the surface in a vertical or inclined position. The crucible A of suitable material contains melted aluminium in a very fluid condition—that is to say, heated to a temperature above its fusing-point. When the scourer vessel is in position over the crucible A, the cap N, Fig. 4, is melted off either by a jet of flame or by a highly-heated block of iron applied to it or otherwise. The twyer being thus uncapped the jet of sodium is projected forcibly into the midst of the aluminium, with which it becomes alloyed as a result of the energetic stirring and dispersion produced by the penetrative effect of the jet. If the twyer were closed by a soldered capsule, its unstoppage would be similarly effected. It will be understood that the crucible A may have a cover with a hole in it for the twyer and making a more or less tight joint. The details and accessories of this kind would vary according to circumstances, and being outside the scope of the process itself they are omitted from the present description. By a similar operation and with the same apparatus an alloy of zinc and calcium may be prepared. In this case the crucible A, which may be placed over a furnace, would contain zinc in thoroughly molten condition covered with a layer of molten chlorid of calcium. The operation is conducted as before, the jet of sodium being made to traverse the chlorid of calcium and carry it along with it down into the mass of zinc, the intimate incorporation due to the penetrative action of the jet resulting in the reduction of the chlorid of calcium by the sodium and the formation of an alloy of zinc and calcium, according to the well-known reaction. By means of a similar operation chromium, titanium, tungsten, molybdenum, vanadium, and other metals may be incorporated with cast iron or steel, nickel, copper, &c., in fusion. It is only necessary to cover the cast iron, steel, or copper, &c., with a layer of a molten compound of chromium, titanium, &c., reducible by sodium, and to cause a jet of molten sodium to traverse the mass in a downward direction, whereby to effect simultaneously the reduction of the compound and the incorporation of the chromium, titanium, or other metals to be alloyed with the bath. For the production of magnesium the crucible A is charged with carnallite in igneous fusion and a jet of sodium is then projected, as before described, into the bath, through which it becomes dispersed, the resulting decomposition thus producing magnesium under much more advantageous conditions than when sodium in inert lumps is employed. By operating in a similar manner with a mixture of two or more suitable metallic salts the metals which form the bases of the salts may be alloyed. Thus by injecting, as before described, a jet of liquid sodium into a suitable mixture containing chlorid of magnesium and fluorid of aluminium in fusion an alloy of magnesium and aluminium will be obtained. In this manner all sorts of alloys may be produced, particularly those of the alkali-earth metals, which are difficultly obtainable in a free state. The same apparatus C D, Fig. 1, arranged and operating in a similar manner may also be employed for effecting the purification of cast-iron, copper, nickel, &c., in fusion, contained in a ladle or crucible. The jet of sodium being projected downward at a very high pressure penetrates the molten metal, combines with the impurities, and carries them off upward and out of the metal either in the form of slag or fumes.

The apparatus represented in Fig. 2 is characterized by the length of twyer E and is adapted for use in purifying ordinary metals in large masses, especially at the moment of tapping off into the ladle from the blast-furnace, converter, cupola, or other furnace or producing apparatus. This long twyer is employed in applying the process to the treatment of baths of which the level gradually rises. It also simplifies the operation by dispensing with the necessity of having to unseal the end of the twyer, which in this instance opens automatically at the proper moment, as hereinafter explained. As an example of the operation, I will describe the final purification of a bath of steel B, being the last fusion run from the Bessemer or Thomas converter or Siemens-Martin furnace into a ladle A, Fig. 2. The vessel C E is charged with sodium and is put under pressure and prepared as hereinbefore described. The twyer E is formed of a thick iron or steel tube having a bore of about three millimeters and whose extremity O is closed either by compression or by forging or welding or by means of a screw-cap. The twyer should be long enough to reach nearly to the bottom of ladle A, the container C being supported well above the ladle. The apparatus after having been charged, heated throughout, and put under pressure is placed in the position represented in Fig. 2 with the twyer dipping into the ladle and there firmly secured by any suitable mechanical means. Molten steel is then run into the ladle, in which it gradually rises and soon reaches the end of the twyer, which rapidly becomes fused at the point of contact in consequence of the high temperature of the inflowing steel. The sodium finding an issue through the twyer is discharged in the form of a fine rapid jet, which quickly penetrates the mass and becomes disseminated throughout and comes into intimate contact with the oxids, sulfids, &c., under the most favorable conditions for their conversion into light fusible or volatile slag, which becomes completely separated from the metal. As the steel rises the twyer becomes shortened, the lower end, which dips in the molten steel, gradually melting away; but it does not cease to be in touch with the bath, and the operation is not in any way impeded by this gradual shortening of the twyer. This particular feature of a fusible metallic twyer greatly simplifies the working of the process of purification of metals on a large scale, inasmuch as the operation is thereby rendered automatic and safe, no work being required to be done during the running-in of the metals, and, in short, affords a complete and satisfactory mode of operation. After each operation the twyer E is replaced by a fresh one either entirely or at least as regards the part which has been destroyed. By means of similar operations I may purify cast-iron as it comes from the blast-furnace or cupola, and also nickel or copper as it leaves the melting-furnace; but it would be preferable to employ a nickel twyer in the one case and a copper twyer in the other.

Fig. 3 represents another arrangement of twyer, consisting of the same metal tube E, closed at the end as before and made of a metal suited to the bath to be treated. In this instance the twyer is inclosed in a protective sheath of refractory material capable of resisting the action of the baths and the temperature at which the operation is performed. This refractory sheath would be firmly secured in place either by a metal collar P at its upper end or otherwise. This construction of twyer may also be employed in the operation before described with reference to Fig. 2, it being suited for leading the sodium into the lower part of the bath, especially when it is deep or covered with slag or cinder, upon which the sodium is not required to act. It is also equally suitable for baths in which the level falls during the incorporation of the sodium, and is particularly useful for the treatment of metals while yet contained in the producing-furnace before running off. The refractory sheath L protects the twyer from the molten bath and the ambient heat, which would destroy it in course of the operation. It is, however, essential that the end O should remain free and bare in order that it may become fused on contact with the bath, and thus automatically give passage to the sodium at the proper moment.

The descriptive details hereinbefore given suffice to enable the action of the twyer to be understood. The container C is prepared, put under pressure and in condition for working, as before stated, and is then brought into position over the bath and the twyer immersed more or less deeply therein, whereupon its point becomes melted off and gives passage to the jet of sodium, which by its vigorous stirring movement becomes distributed throughout the lower part of the mass in fine particles capable of immediately entering into reaction, as previously described. The twyer E, being protected by the refractory sheath L, will only be slightly shortened during the operation, so that it may be applied to act on metallic baths in the furnaces themselves or in ladles of greater depth. The twyer of which the end has been burned off should be either wholly or partly renewed, as also its sheath, after each operation. The bore of the sheathed twyer may be of increased diameter at its upper part, where the bath does not exert any destructive action.

The sodium-container may be made either of cylindrical, spherical, ovoid, or other form, and the compressed gas may be contained in a chamber separate from the sodium-container and be connected thereto by a pipe of the necessary strength, thus forming a two-chambered apparatus. The container may be connected to the twyer by means of elbows, either for the purpose of keeping the vessel C at a distance from the ladle, in which the reaction is performed, or for facilitating the adaptation of the apparatus to melting-furnaces or other producers, and the axes of the twyer and vessel C may have different directions, according to circumstances. The pressure applied at F upon the sodium may be varied at will and within very extended limits without affecting the principle of the process, which does not depend on any particular pressure, which, however, decreases in consequence of the expansion which takes place during the course of the operation. The twyer D, Fig. 1, projecting the jet from a distance, requires a higher pressure, while the protected twyer E, Fig. 3, even with lower pressure enables penetration of the sodium to a considerable depth. The pressure should not be below forty-two pounds per square inch, while pressures of two hundred and eighty-five pounds, five hundred and thirty pounds, or even seven hundred pounds per square inch and upward are more efficacious, especially for the treatment of heavy metals in large masses.

I claim—

1. The herein-described process for the treatment of molten matters, which consists in injecting molten alkali in an attenuated jet into said matters.

2. The herein-described process for the treatment of molten matters, which consists in projecting an attenuated jet of molten sodium into such matters.

3. The herein-described process for the treatment of molten matters, which consists in forcibly introducing liquid material lighter than said matters downwardly into such matters.

4. The herein-described process for the treatment of molten matters, which consists in injecting finely-subdivided sodium into the molten matter.

5. The herein-described process for the treatment of molten matters, which consists in spraying liquid alkali into the molten matter.

6. The herein-described process for the treatment of molten matters which consists in forcibly projecting an attenuated jet of molten material lighter than said molten matters downwardly into such matters.

7. The herein-described process for the treatment of molten matters which consists in forcibly projecting an attenuated jet of molten sodium into such matters.

8. The herein-described process for the treatment of molten matters which consists in forcibly projecting an attenuated jet of molten material into such matters by pressure generated by the heat applied to melt said material.

9. The herein-described process for the treatment of molten matters which consists in forcibly projecting an attenuated jet of molten material into such matters by pressure generated by a highly-expansible substance confined with said molten material during the application of heat to melt said material.

10. The herein-described process for the treatment of molten matters which consists in forcibly projecting an attenuated jet of molten lighter material downwardly into such matters by pressure generated by a still lighter highly-expansible substance confined with and above said molten material during the application of heat to melt said material.

The foregoing specification of my improvements in and in apparatus for the treatment of metals or matters in fusion with sodium or alkaline compounds signed by me this 15th day of December, 1902.

PAUL LÉON HULIN

Witnesses:
 GAUTIER C.
 RYOYA F'.